United States Patent [19]

Hennenfent et al.

[11] 4,236,355
[45] Dec. 2, 1980

[54] PRECISION GRINDING WHEEL MOUNT

[75] Inventors: Douglas J. Hennenfent, Minneapolis; Robert A. Johnson, Minnetonka; Allan L. Holmstrand, Bloomington, all of Minn.

[73] Assignee: Control Data Corporation, Minneapolis, Minn.

[21] Appl. No.: 927,321

[22] Filed: Jul. 24, 1978

[51] Int. Cl.³ .............................................. B24B 41/00
[52] U.S. Cl. ....................................................... 51/168
[58] Field of Search ............................... 51/168, 209 R

[56] References Cited
U.S. PATENT DOCUMENTS

| | | | |
|---|---|---|---|
| 3,069,817 | 12/1962 | Kohn | 51/209 R |
| 3,353,306 | 11/1967 | Seymour | 51/168 |
| 3,418,759 | 12/1968 | Anderson et al. | 51/37 |
| 3,613,472 | 10/1971 | Held | 51/168 |
| 3,967,415 | 7/1976 | Seckinger | 51/168 |

Primary Examiner—Othell M. Simpson
Assistant Examiner—Roscoe V. Parker
Attorney, Agent, or Firm—Edward L. Schwarz

[57] ABSTRACT

Apparatus for mounting a thin flexible grinding wheel to allow accurate cutting of kerfs therewith. A method of precision assembly of the apparatus is also disclosed.

2 Claims, 4 Drawing Figures

PRECISION GRINDING WHEEL MOUNT

BACKGROUND

An application having common inventorship and filing date with this one, and entitled "Narrow Track Ferrite Head Cores", describes a magnetic head core for use in digital data recording on magnetic media. The outstanding feature of these cores are that the individual ferrite grains which have been sintered together to form a core have been cut along the edges which define the transducing face of the core, rather than having been torn from the surface by the machining process. As explained in the referenced application, the projection which carries the transducing face may be very thin (as thin as 0.025 mm.) and several times as tall as it is thick making in an extremely fragile element. To allow formation of such a projection by machining a brittle material such as ferrite, it is necessary to employ a grinding wheel having very low axial and radial runout. The subject of this invention is a grinding wheel which when precisely mounted on an air bearing spindle will have as good or better runout characteristics than that required by the referenced application. Of course, when the design of this grinding wheel mounting becomes well known, undoubtedly other applications for it will arise.

BRIEF DESCRIPTION OF THE INVENTION

The grinding wheel assembly forming the subject of this application has three separate elements, in addition to the fasteners necessary to hold it together. The grinding wheel itself comprises a relatively large, thin, flexible, annular hub having a thin band of abrasive around its periphery. The hub has a large central opening surrounded by a plurality of equi-spaced holes axial with the central opening, by which the wheel itself is mounted. Preferably, the wheel has substantially flat, parallel sides to the outer periphery of the abrasive band, although it is not necessary that more than a preselected radius of the hub outside the mount be perfectly flat.

The wheel is supported on a spindle by a relatively thicker and stiffer mounting disc which has a flat surface adapted to bear against the flat surface on one side of the hub. The wheel is clamped to the holes in the disc by cylinder type fasteners, passing through a relatively stiff clamping plate, and threading into corresponding holes in the disc to clamp the assembly together. In the preferred embodiment, the outer radius of both the clamping plate and the mounting disc is slightly greater than that of the grinding wheel hub, to furnish some support for the abrasive. Further, the grinding wheel preferably has each side of the abrasive band very slightly below the plane of the hub, a condition which can be easily created by appropriate preassembly machining of the wheel.

To allow precise centering of the grinding wheel assembly on the spindle, mating centering features are present on both the spindle and the mounting disc. These centering features precisely mate in a manner which prevents radial movement of the disc with respect to the spindle. Preferably the feature on the disc is a hole precisely concentric with the hub opening and the spindle has a circular cross section projection precisely fitting the disc's hole. Holes in the mounting plate are positioned to conjoin with holes in the spindle allowing another group of cylinder-type fasteners to securely attach the mounting disc to the spindle. This arrangement allows the grinding wheel mount assembly to be rapidly attached to and detached from the spindle.

A special aligning plug is used to assure accurate assembling of the assembly. The plug comprises two circular cross section prisms concentrically fixed to each other, the larger having an outside radius equal to the inside radius of the grinding wheel hub and clamping plate and the smaller having the radius of the centering feature. Placing the grinding wheel and clamping plate over the larger radius and the mounting disc's centering hole over the smaller radius of the plug positions the grinding wheel and clamping very accurately with respect to the disc's centering hole. Tightening the clamping fasteners while the wheel and disc are on the plug preserves this precise alignment. To allow the wheel and disc to maintain this alignment while the clamping fasteners are being inserted and tightened, the holes in both the wheel and clamping plate should be somewhat larger than the fasteners.

Accordingly, one purpose of this invention is to provide a grinding wheel assembly having very little axial and radial runout.

Another purpose of this invention is to provide a grinding wheel which causes very little mechanical impact between itself and its workpiece.

Still another purpose is to provide a grinding wheel assembly having the above characteristics and yet capable of being rapidly mounted and dismounted from its spindle.

Another purpose of this invention is to provide for easy alignment of the grinding wheel assembly while dismounted from the spindle.

Other purposes and aims of this invention will be evident during the description which follows.

DESCRIPTION OF THE PREFERRED EMBODIMENTS

Figure 1:
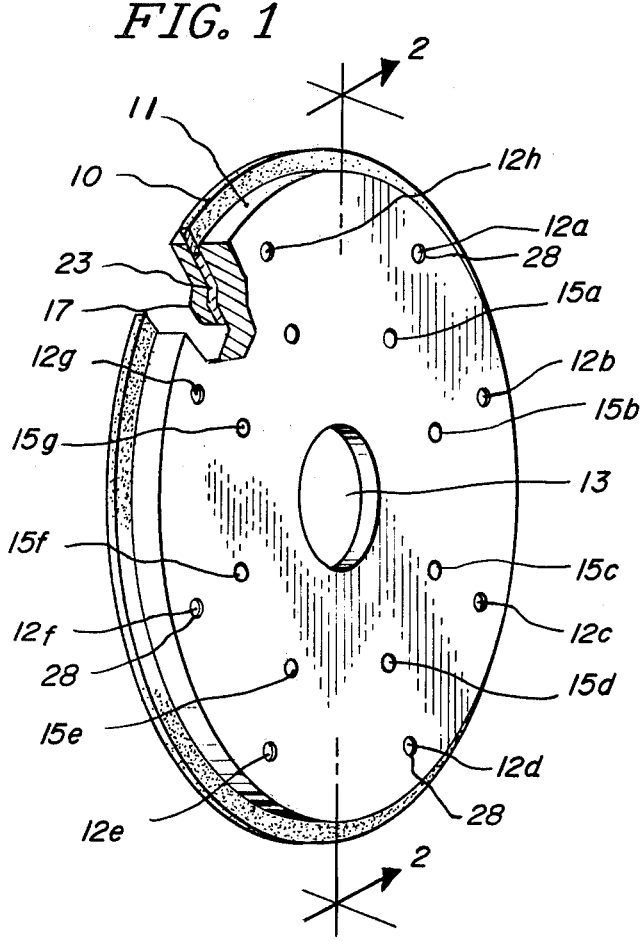
FIG. 1 is a perspective view of the side of the grinding wheel mount assembly to be fastened to the spindle.
Figure 2:
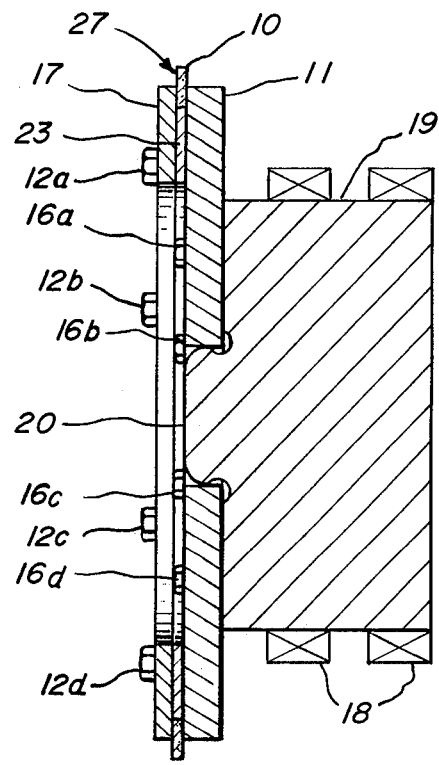
FIG. 2 is a cross section view of the grinding wheel assembly fastened to such a spindle.

Turning first to FIG. 1, the grinding wheel assembly is shown in condition for attachment to spindle 19, as shown cross sectionally in FIG. 2. Grinding wheel 27 is shown in FIG. 1 with the inner radius of hub 23 visible in the cutout and the outside radius of abrasive band 10 entending past mounting disc 11. The two radii of hub 23 are typically 5 to 10 cm. each with the difference in radii being 1 to 3 cm. The abrasive band is firmly bonded to the outer surface of hub 23 and may have an additional 0.5 to 1 cm. of radius. Each entire side of grinding wheel 27 is preferably precision lapped to have error in constant thickness of less than the maximum runout allowable. Thus, deviation from constant thickness must be less than 0.0025 mm. to limit axial runout to 0.0025 mm. when the assembly is in use on a modern, high precision air bearing. Lapping is also preferred because it permits band 10's thickness to be reduced to less than that of hub 23. Wheel 27 is attached to mounting disc 11 by cylinder type fasteners 12a–h which thread into fastener holes 28 after passing through holes in clamping plate 17 and hub 23 arranged to conjoin therewith. Fasteners 12a-h are standard cap screws or round head screws first passing through clamping plate 17 on the side of wheel 27 opposite disc 11. Clamping plate 17 and mounting disc 11 are both substantially thicker and stiffer than wheel 27 to assure that wheel 27 will conform to the flatness of the face of disc 11 against which it is clamped. To assure axial runout less than the specified tolerance, the faces of disc 11 must be machined to parallelism and flatness of a precision which has deviations from perfection less than the difference between the allowable runout and wheel 27's thickness error. The outside radius of disc 11 must be outside the fastener holes in hub 23 of course, but preferably extends part way into abrasive band 10 to provide support for it. Preferably clamping plate 17 has an inside radius equal to hub 23's opening, and an outside radius substantially that of disc 11's.

Hole 13 in mounting disc 11 is a centering feature. Hole 13 is preferably almost perfectly circular and must be precisely centered with respect to grinding wheel 27. It is preferred that wheel 27 have as its radial reference surface the inside radius of hub 23. If this is the case, then hole 13 should be precisely centered with respect to this inner surface. To assure rotational balance and reduce radial runout, the outer radius of band 10 should be concentric with hub 11's inner radius and circular to a few hundredths of a mm. After assembly and mounting, the assembly can be dressed to the desired radial runout.

Holes 15a-h are used to attach mounting disc 11 to spindle 19. Spindle 19 is supported by bearings 18, which are the common type of air bearing widely used and available for any type of high precision support for rotating shafts. The end of spindle 19 has centering feature 20, in this case shown as a projecting frustrum of a sphere arranged to precisely engage and closely mate in line contact with hole 13 of hub 11 to prevent any relative radial movement between plate 11 and spindle 19 when so mated. Fastener holes 15a-h are arranged around centering hole 13 in disc 11 to conjoin with drilled and tapped holes on the face of spindle 19. Fasteners 16a-h pass through holes 15a-h and screw into spindle 19's face. Although 8 fasteners 16a-h are shown, actually any number from 6 to 12 are probably suitable. It is necessary that the face of spindle 19 surrounding centering feature 20 and which contacts the surface of disc 15 be machined flat to match the precision of the sides of disc 11, to prevent any distortion of the assembly when it is being bolted to spindle 19.

To achieve the full precision which this approach allows, we prefer that the flat surfaces of wheel 27 and mounting disc 11 be parallel lapped with free grits to achieve the final precision desired. In the case of a wheel 27 whose abrasive band 10 has a plastic or other soft matrix, use of a free grit during lapping causes abrasive band 10 to be eroded 0.0005 to 0.0010 mm. below the plane of hub 23. This is desirable because then neither plate 17 nor disc 11 actually touch band 10 until it is deflected during use, and then provide useful support for it.

Figure 3:
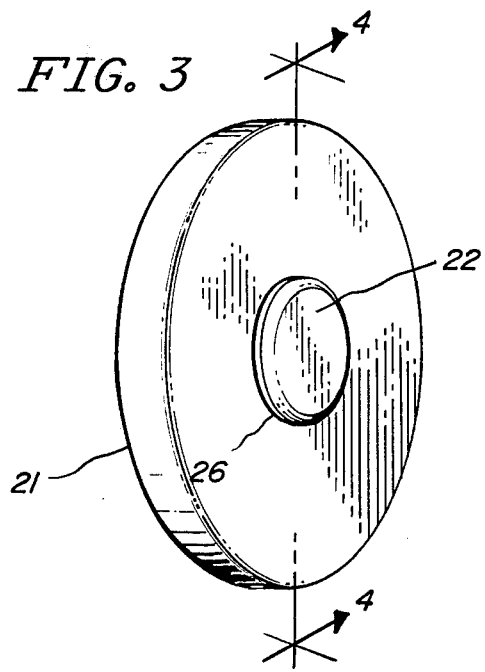
FIG. 3 is a perspective view of the aligning plug used for accurately assembling the grinding wheel assembly.
Figure 4:
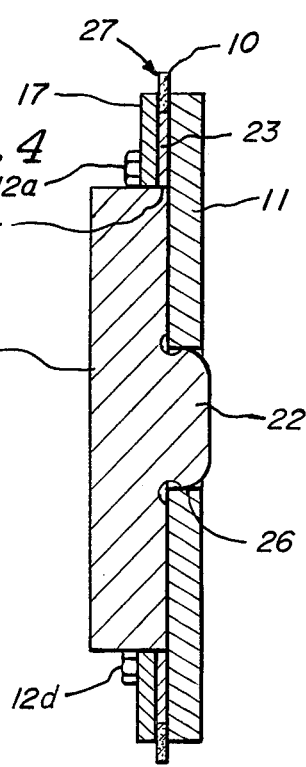
FIG. 4 is a cross section of the plug positioned in the grinding wheel assembly during its assembly.

One of the major advantages of this construction is that it allows all of the steps requiring high precision operations, which customarily are relatively slow, to be performed independent of the spindle and drive mechanism. We have found that the most convenient way to assemble and align the grinding wheel assembly is to use a plug 21, such as the one shown in FIG. 3. Cylinder 21 has a radius precisely equal to the inside radius of the hub 23. Centering feature 22 is substantially identical to centering feature 20 carried by spindle 19. Centering feature 22 is preferably a short projection having a circular radius 26 which is precisely concentric with the circle defined by cylinder 21 and has a maximum radius precisely equal to that of centering hole 13.

To align wheel 27 with mounting disc 11, wheel 27 is slipped over cylinder 21, and mounting centering disc 11 is slipped over radius 26 carried by centering feature 22. Wheel 27 is rotated with respect to disc 11 until the holes through which fasteners 12a-h pass are aligned, clamping plate 17 is placed on the opposite side of wheel 27 with its holes conjoined with the aforementioned holes in wheel 27 and disc 11, and then fasteners 12a-h are screwed into the holes in disc 11 to permanently clamp the parts together. The holes in both wheel 27 and clamping plate 17 through which fasteners 12a-h pass must be slightly larger than the diameter of fasteners 12a-h to provide a tolerance for misalignment between the holes caused by the precise alignment between wheel 27, clamping plate 17, and disc 11 demanded by centering plug 21. Fasteners 12a-h should be torqued down according to standard engineering practice for maximum accuracy.

Many variations on this design are possible. One might be to thread the holes in clamping plate 17 instead of mounting disc 11. The principles involved, that of forcing wheel 27 to take the trueness of disc 11, remain the same. We don't prefer this approach because it limits the area of contact with spindle 19. In theory, disc 11 and spindle 19's face could have surfaces non-perpendicular to the axis of spindle 19 but which mate to properly orient wheel 17 perpendicular to this axis. This is an extremely expensive and hence undesirable approach. It's possible to place the projecting centering feature on mounting disc 11 and the centering hole on spindle 19, but this will prevent parallel lapping of disc 11, reducing the accuracy of disc 11's geometry. Other variations are possible as well, of course, but the basic philosophy as previously explained remains the same.

We claim:

1. A grinding wheel mount assembly having a substantially flat surface, said surface to be fastened for load bearing to a faceplate carried on the end of a spindle mounted for rotation, said faceplate including a substantially flat surface to which the assembly's flat surface is to be fastened, a centering feature precisely centered on the spindle's axis of rotation within the flat surface of the faceplate, and a plurality of attachment holes surrounding the centering feature for fasteners fastening the assembly to the faceplate, wherein the assembly comprises:

(a) a flexible grinding wheel having an annular hub having a plurality of axially directed spaced apart holes therein, and an annular band of abrasive disposed about the rim of the hub and firmly bonded thereto, said wheel having sides parallel to each other, and having each side of the abrasive band very slightly below the adjacent plane of the hub;

(b) a clamping plate in the shape of annular ring whose interior opening is at least the same size as the hub's central opening, having an external diameter at least that of the hub's outer diameter, having a plurality of axially directed holes substantially the size of those in the hub passing between the two faces of the plate and spaced to conjoin with those in the hub when properly oriented therewith, and having a flat side perpendicular to the axis;

(c) a mounting disc having (i) the substantially flat surface of the assembly, (ii) a centrally located centering feature within said surface shaped to closely mate with the faceplate's centering feature to prevent relative radial movement between the mounting plate and the faceplate when so mated, (iii) a plurality of axially directed holes located to conjoin with the faceplate's attachment holes when so mated to permit fasteners to pass therethrough to fasten the flat surface of the assembly to the faceplate, and (iv) a plurality of holes located to conjoin with the holes in the hub when the hub is properly oriented therewith; and (d) a plurality of cylinder type fasteners passing sequentially through first the clamping plate and then the hub into the mounting disc to firmly clamp the grinding wheel between the flat side of clamping plate and the flat surface of the mounting disc concentrically with both.

2. The assembly of claim 1 wherein the side of the abrasive band is below the adjacent surface of the hub by an amount approximately between 0.0005 and 0.001 mm.

* * * * *

UNITED STATES PATENT AND TRADEMARK OFFICE
CERTIFICATE OF CORRECTION

PATENT NO. : 4,236,355
DATED : July 24, 1980
INVENTOR(S) : D. J. Hennenfent, et al It is certified that error appears in the above—identified patent and that said Letters Patent is hereby corrected as shown below:

On the front page, at [73] for "CONTROL DATA CORPORATION" read --MAGNETIC PERIPHERALS INC.--

Signed and Sealed this

Third Day of March 1981

[SEAL]

Attest:

RENE D. TEGTMEYER

*Attesting Officer*   *Acting Commissioner of Patents and Trademarks*